United States Patent
Saitou et al.

(10) Patent No.: US 8,597,793 B2
(45) Date of Patent: Dec. 3, 2013

(54) DECORATIVE SHEET, PROCESS FOR PRODUCING DECORATIVE RESIN MOLDED PRODUCT, AND DECORATIVE RESIN MOLDED PRODUCT

(75) Inventors: Nobuo Saitou, Saitama (JP); Jun Kaneki, Okayama (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 231 days.

(21) Appl. No.: 12/991,738

(22) PCT Filed: Jun. 29, 2009

(86) PCT No.: PCT/JP2009/061882
§ 371 (c)(1),
(2), (4) Date: Mar. 2, 2011

(87) PCT Pub. No.: WO2010/001867
PCT Pub. Date: Jan. 7, 2010

(65) Prior Publication Data
US 2011/0143128 A1    Jun. 16, 2011

(30) Foreign Application Priority Data

| Jun. 30, 2008 | (JP) | 2008-171647 |
| Jun. 30, 2008 | (JP) | 2008-171648 |
| Mar. 31, 2009 | (JP) | 2009-088073 |
| Mar. 31, 2009 | (JP) | 2009-088075 |

(51) Int. Cl.
*B32B 27/08* (2006.01)
*B32B 27/00* (2006.01)
*C09J 7/02* (2006.01)
*G11B 5/64* (2006.01)

(52) U.S. Cl.
USPC ........... 428/500; 428/335; 428/336; 428/337; 428/515; 264/571

(58) Field of Classification Search
None
See application file for complete search history.

(56) References Cited

U.S. PATENT DOCUMENTS

| 6,103,352 A * | 8/2000 | Takahashi | 428/195.1 |
| 6,596,390 B1 | 7/2003 | Negele et al. | |
| 6,617,008 B1 * | 9/2003 | Kono et al. | 428/195.1 |

FOREIGN PATENT DOCUMENTS

| EP | 1 800 859 | 6/2007 |
| JP | 2-139328 | 5/1990 |
| JP | 4-4130 | 1/1992 |
| JP | 6-134859 | 5/1994 |
| JP | 2001-199013 | 7/2001 |
| JP | 2002-103524 | 4/2002 |
| JP | 2004-322501 | 11/2004 |
| JP | 2006-272586 | 10/2006 |
| JP | 2008-094074 | 4/2008 |
| JP | 2008-105420 | 5/2008 |
| WO | WO 2006/035880 A1 | 4/2006 |

OTHER PUBLICATIONS

Extended European Search Report dated Sep. 28, 2012, including the Supplementary European Search Report and European Search Opinion, for EP Application No. 09773445.3-2307/2298526 (PCT/JP2009/061882).

* cited by examiner

*Primary Examiner* — Sheeba Ahmed
(74) *Attorney, Agent, or Firm* — Antonelli, Terry, Stout & Kraus, LLP.

(57) ABSTRACT

A decorative sheet for insert molding prepared by laminating at least a surface protective layer on a support that includes an ABS resin, wherein the support has a flexural modulus of 1500 to 3000 MPa, and a thickness of 100 to 500 μm; the surface protective layer is obtained by cross-linking and curing an ionizing radiation curable resin composition; and the ionizing radiation curable resin composition has a tensile modulus of more than 100 MPa to less than 1000 MPa and a static frictional coefficient of 1.0 or less on a surface. The decorative sheet for insert molding includes at least a picture layer, a low glossy picture ink layer provided partially and the surface protective layer in this order on the support. The surface protective layer has a thickness of 1 to 30 μm.

14 Claims, 1 Drawing Sheet

DECORATIVE SHEET, PROCESS FOR PRODUCING DECORATIVE RESIN MOLDED PRODUCT, AND DECORATIVE RESIN MOLDED PRODUCT

BACKGROUND OF THE INVENTION

The present invention relates to a decorative sheet, a production process for a decorated resin molding using the above decorative sheet and a decorated resin molding produced by the above production process.

RELATED ART

Decorated moldings decorated by laminating decorative sheets on the surfaces of moldings are used for various applications such as automobile interior parts and the like. A molding method for the above decorated moldings includes an insert molding method in which a decorative sheet is molded in advance in a stereoscopic form by a vacuum molding die and inserted into an injection molding die and in which a resin staying in a fluid state is injected into the die to integrate the resin with the molded sheet (refer to, for example, a patent document 1).

On the other hand, a surface protective layer is provided on a decorated molding for the purpose of improving an abrasion resistance and a scratch resistance of the surface. In the insert molding method described above, however, the decorative sheet is stretched more than in a minimum required amount by a vacuum pneumatic action in a step in which the decorative sheet is molded in advance in a stereoscopic form by a vacuum molding die, or the molded sheet is stretched more than in a minimum required amount by a pressure of the molten resin and extension exerted by a shearing stress in a step in which the resin staying in a fluid state is injected into the die to integrate the resin with the molded sheet, and therefore there has been involved therein the problem that cracks are caused on a surface protective layer in a curved part of the molding.

In order to meet the problem described above, a thermosetting resin has so far been used for the surface protective layer in order to enhance a moldability of the surface protective layer (refer to, for example, a patent document 2). The thermosetting resin shows a good result of a moldability, and cracks are less liable to be produced on the surface protective layer, but an abrasion resistance and a scratch resistance on a surface of the decorated molding have not been satisfactory.

Also, it has so far been tried to enhance an abrasion resistance and a scratch resistance on a surface of a decorated molding by using an ionizing radiation curable resin such as a UV ray curable resin and the like for a surface protective layer to enhance a cross-linking density of a resin forming a surface protective layer of a decorative sheet, but there has been brought about the problem that cracks are caused in a curved part of the molding in molding.

Further, there has been tried a method in which an ionizing radiation curable resin such as a UV ray curable resin and the like is used for a surface protective layer and allowed to stay in a semi-cured state in a stage of a decorative sheet and in which it is completely cured after subjected to decoration molding (refer to, for example, a patent document 2). However, the surface protective layer containing an uncured resin component is liable to be scratched and hard to be handled, and a problem of die contamination caused by adhesion of the uncured resin component onto the die has been involved therein. In order to solve the above problem, a method in which a protective film is provided on the surface protective layer staying in a semi cured state is available, but it makes the production complicated and is a cause of an increase in the cost. Further, the molding of a three-dimensional form has to be irradiated with a UV ray, and therefore an equipment in which a molding of a three-dimensional form can be irradiated with a UV ray is separately required.

On the other hand, a high grade feeling comes to be required as well in decorated moldings used for automobile interior parts and the like because of a trend of consumers toward high grade articles in recent years, and it is important to not only provide a decorated molding with a picture but also endow it with a texture. It is required to provide a specific part of patterns with delustering and unevenness.

Patent document 1: Japanese Patent Application Laid-Open No. 322501/2004
Patent document 2: Japanese Patent Application Laid-Open No. 134859/1994

DISCLOSURE OF THE INVENTION

In light of the problems described above, an object of the present invention is to provide a decorative sheet which has a high abrasion resistance and a high scratch resistance and is provided with a good moldability and which has a surface protective layer causing no cracks and is provided with a high design property and used for molding a decorated molding, a production process for a decorated resin molding using the above decorative sheet and a decorated resin molding produced by the above production process.

Intensive researches repeated by the present inventors in order to achieve the object described above have resulted in finding that the problems described above can be solved by using a specific support, using an ionizing radiation curable resin composition for a surface protective layer and controlling a static frictional coefficient on a surface in a decorative sheet for insert molding prepared by laminating a surface protective layer on a support which has so far been used as a backer layer in an insert molding method.

Further, the problems described above can be solved by laminating a picture layer, a low glossy picture layer provided partially and a surface protective layer in this order on a support which is used as the above backer layer, using an ionizing radiation curable resin composition for a surface protective layer and controlling a thickness of the surface protective layer to a specific value. The present invention has been completed based the above knowledge.

That is, the present invention provides the following items:
(1) a decorative sheet for insert molding prepared by laminating at least a surface protective layer on a support comprising an ABS resin, wherein the above support has a flexural modulus of 1500 to 3000 tea; the above support has a thickness of 100 to 500 µm; the surface protective layer is obtained by cross-linking and curing an ionizing radiation curable resin composition; and the above ionizing radiation curable resin composition has a tensile modulus of more than 100 MPa to less than 1000 MPa which is measured by the following method and a static frictional coefficient of 1.0 or less on a surface and
(2) a decorative sheet for insert molding comprising at least a low glossy picture ink layer provided partially and a surface protective layer in this order on a support, wherein the above surface protective layer is present on the low glossy picture ink layer and brought into contact therewith, and it is coated over a whole surface including an area where the above low glossy picture layer is formed and an area where the low glossy picture layer is not formed; the surface protective layer is obtained by cross-linking and curing an ionizing radiation curable resin composition; and the surface protective layer has a thickness of 1 to 30 µm.

The decorative sheet of the present invention for insert molding is excellent in an abrasion resistance, a scratch resistance and a fragility resistance and has a good moldability since cracks are not produced on the surface protective layer in molding. In addition thereto, the decorative sheet of a low cost can be provided, and the decorated molding can be endowed with a high design property.

EXPLANATION OF THE CODES

Figure 1:
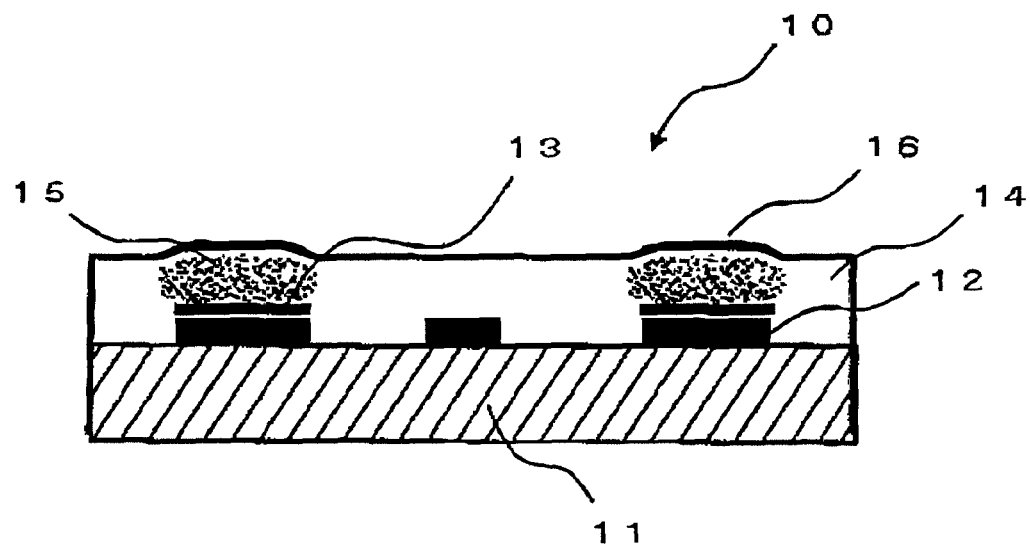
FIG. 1 is a schematic drawing showing a cross section of the decorative sheet of the present invention.

10 Decorative sheet
11 Support
12 Picture layer
13 Low glossy picture layer
14 Surface protective layer
15 Low lustrous area
15 Convex form

BEST MODE FOR CARRYING OUT THE INVENTION

The decorative sheet of the present invention for insert molding comprises the following two embodiments. That is,
(1) a decorative sheet for insert molding prepared by laminating at least a surface protective layer on a support and
(2) a decorative sheet for insert molding comprising at least a low glossy picture layer provided partially and a surface protective layer in this order on a support. The respective embodiments of the decorative sheets of the present invention for insert molding shall be explained below with reference to FIG. 1 and FIG. 2.

Figure 2:
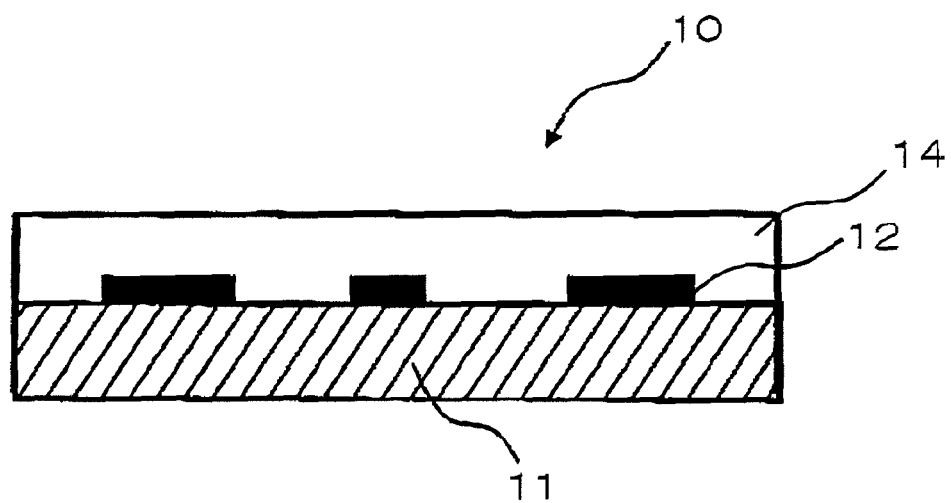
FIG. 2 is a schematic drawing showing a cross section of another embodiment of the decorative sheet according to the present invention.

FIG. 1 and FIG. 2 are schematic drawings showing a cross section of the decorative sheet 10 of the present invention for insert molding (herein after referred to merely as "the decorative sheet of the present invention").

The first embodiment in the decorative sheet of the present invention has a structure in which a picture layer 12 and a surface protective layer 14 are laminated in this order on a support 11, and a low glossy picture ink layer 13 may be provided, if necessary, between the picture layer 12 and the surface protective layer 14. Also, a masking layer may be provided between the support 11 and the picture layer 12. Further, a primer layer may be provided between the picture layer 12 and the low glossy picture ink layer 13. Alternatively, assumed is an embodiment in which the picture layer 12 and the surface protective layer 14 are laminated in this order, as shown in FIG. 2, on the support 11 and in which the low glossy picture ink layer 13 is not provided. In the above embodiment, a design which is highly lustrous and excellent in a flatness and a specular property can be expressed as described later in details. Further, a primer layer may be provided between the picture layer 12 and the surface protective layer 14.

The second embodiment in the decorative sheet of the present invention has a structure in which the picture layer 12, the low glossy picture ink layer 13 and the surface protective layer 14 are laminated in this order on the support 11. As is the case with the first embodiment, a masking layer may be provided between the support 11 and the picture layer 12, and a primer layer may be provided between the picture layer 12 and the low glossy picture ink layer 13.

The support 11 in the decorative sheet 10 of the present invention is a support called a backer layer in a conventional decorative sheet for insert molding. In a conventional decorative sheet for insert molding, a picture layer and the like are printed separately on a base material sheet, and the same resin as an injection molding resin or a resin having a high adhesive property with the injection molding resin is laminated as the backer layer on the base material to carry out insert molding. The decorative sheet of the present invention is characterized by laminating the picture layer and the like directly on the support 11, and a so-called backer layer is not used.

The support 11 used for the decorative sheet 10 according to the first embodiment of the present invention comprises an ABS resin. The ABS resin is a preferred resin in terms of preventing cracks, scratches and the like on a surface of the molding.

The support 11 used for the decorative sheet 10 according to the first embodiment of the present invention has a flexural modulus of 1500 to 3000 MPa. If the above flexural modulus is 1500 MPa or more, the decorative sheet has a good moldability and is excellent in a form-holding property particularly after carrying out vacuum molding. Further, the surface hardness represented by a pencil hardness test is enhanced, and the decorative sheet which is durable against scratches produced by boring can be prepared. On the other hand, if the above flexural modulus is 3000 MPa or less, the satisfactory moldability can be secured. From the viewpoints described above, a flexural modulus of the support 11 falls more preferably in a range of 1700 to 2600 MPa. The flexural modulus is measured according to JIS K7171 (150178).

The support 11 has a thickness falling in a range of 100 to 500 µm. If it is 100 µm or more, the decorative sheet 10 can be provided with a sufficiently high strength, and the film thickness after following the form is stabilized in vacuum molding. Further, the decorative sheet is prevented from being wrinkled due to flowing of the molten resin in injection molding. On the other hand, if the thickness is 500 µm or less, the decorative sheet can sufficiently follow a fine irregular form in vacuum molding, and trimming after vacuum molding is easy. From the viewpoints described above, a thickness of the support 11 falls more preferably in a range of 200 to 400 µm.

Next, the support 11 used for the decorative sheet 10 according to the second embodiment of the present invention includes an ABS resin, a polyolefin resin, a styrene resin, an acryl resin, a vinyl chloride resin, a polycarbonate resin and the like. The polyolefin resin is preferably a polypropylene resin. Among the above resins, an ABS resin and a polypropylene resin are more preferred.

A thickness of the support 11 falls preferably in a range of 100 to 500 µm. The reason why the above range is preferred is the same as described in the decorative sheet 10 according to the first embodiment described above, and a more preferred thickness of the support 11 falls in a range of 200 to 400 µm.

Also, a flexural modulus of the support 11 falls preferably in a range of 1500 to 3000 MPa. The reason why the above range is preferred is the same as described in the decorative sheet 10 according to the first embodiment described above, and it falls more preferably in a range of 1700 to 2600 MPa.

The support 11 may comprise either a single layer or plural layers in both of the first embodiment and the second embodiment, and a case of the plural layers includes, for example, a case in which the surface of the support 11 is subjected to blocking-preventing treatment, primer treatment or acid treatment and in which a blocking-preventing layer, a primer layer or an acid-modifying layer is formed on the surface.

Further, the support 11 can be subjected, if necessary, to physical or chemical surface treatment by an oxidation method or a roughening method in order to enhance adhesion thereof to a layer provided thereon.

The oxidation method described above includes, for example, corona discharge treatment, chromium oxidation treatment, flame treatment, hot air treatment, ozone/UV ray treatment and the like. The roughening method includes, for example, a sand blast method, a solvent treatment method and the like. The above surface treatments are suitably selected according to the kind of the substrate, and in general, the corona discharge treatment method is preferably used in terms of an effect and an operating property.

Further, the above support 11 may be subjected, it necessary, to treatment such as forming a primer layer, and coating may be carried out in order to adjust the color, or a pattern may be formed in advance from the viewpoint of a design.

Next, the picture layer 12 shown in FIG. 1 serves for providing the resin molding with a decorative property, and it is formed by printing various patterns with an ink by means of a printer. The patterns include woodgrain patterns, stone-grain patterns imitating the surfaces of rocks such as a marble pattern (for example, travertine marble patterns) and the like, fabric patterns imitating a blanket texture pattern and a cloth-like pattern, tiling patterns, brick work patterns and the like, and they include as well composite patterns thereof such as parquetry patterns, patchwork patterns and the like. The above patterns are formed by multi-color printing with process colors including usual yellow, red, blue and black colors, and in addition thereto, they are formed as well by multi-color printing with special colors using plates of individual colors constituting the patterns.

Materials prepared by appropriately mixing a binder with a colorant such as a pigment, a dye and the like, an extender pigment, a solvent, a stabilizer, a plasticizer, a catalyst, a hardening agent and the like are used as a picture ink used for the picture layer 12. The above binder shall not specifically be restricted, and optional ones selected from, for example, polyurethane base resins, vinyl chloride/vinyl acetate base copolymer resins, vinyl chloride/vinyl acetate/acryl resin base copolymer resins, chlorinated polypropylene base resins, acryl base resins, polyester base resins, polyamide base resins, butyral base resins, polystyrene base resins, nitrocellulose base resins, cellulose acetate base resins and the like are used alone or in a mixture of two or more kinds thereof.

Used as the colorant are inorganic pigments such as carbon black (Japanese ink), iron black, titanium white, antimony white, chrome yellow, titanium yellow, iron oxide red, cadmium red, ultramarine blue, cobalt blue and the like, organic pigments and dyes such as quinacridone red, isoindolinone yellow, phthalocyanine blue and the like, metallic pigments comprising scale-like foil pieces of aluminum, brass and the like and pearlescent (pearl) pigments comprising scale-like foil pieces of titanium dioxide-coated mica, basic lead carbonate and the like.

The masking layer provided, if necessary, between the support 11 and the picture layer 12 is provided for the purpose of preventing an effect from being exerted on colors of patterns in the decorative sheet by a change and a dispersion in the color of the surface of the support 11. Usually, the masking layer is formed in an opaque color in many cases, and a so-called solid print layer having a thickness of 1 to 20 µm is suitably used as the masking layer.

The decorative sheet 10 shown in FIG. 1 shows a case in which the low glossy picture ink layer 13 is provided, but in the decorative sheet 10 according to the first embodiment of the present invention, the low glossy picture ink layer 13 is not an essential constitutional requisite.

On the other hand, in the decorative sheet 10 according to the second embodiment of the present invention, it is characterized that the low glossy picture ink layer 13 is provided.

The low glossy picture ink layer 13 serves for providing the resin molding with a decorative property, and the resin molding can be endowed with delustering and a texture such as an irregular feeling and the like by bringing it into line with the picture layer 12.

The above low glossy picture ink layer 13 is partially provided and interacted with the surface protective layer 14 described later in details, and a low lustrous area 15 is formed in the surface protective layer in an immediately upper part and a vicinity thereof. Observing the decorative sheet 10 of the present invention from a surface protective layer 14 side, the low lustrous area 15 is recognized visually as a concave part, and therefore the whole part is recognized visually as an irregular pattern due to the low lustrous area 15. The low lustrous area 15 is expressed by aggregation of dots in the drawing.

An upper part of the low lustrous area 15 in an outermost surface of the surface protective layer 14 may be lifted up according to formation of the low glossy picture ink layer 13 and provided with a convex form 16.

A difference in a glossiness of the low glossy picture ink layer 13 is considered to be brought about by interactions such as partial dissolution, dispersion, mixing and the like which are brought about between the resin component of the low glossy picture ink layer 13 and the surface protective layer 14 according to combination of the respective materials and suitable selection of the coating conditions in coating an uncured material of the ionizing radiation curable resin for forming the surface protective layer 14 described later in details on the low glossy picture ink layer 13.

A low glossy picture ink for forming the low glossy picture ink layer 13 has a property to bring about an interaction with the ionizing radiation curable resin composition for forming the surface protective layer 14, and it is suitably selected in connection with the above ionizing radiation curable resin composition (uncured material). To be specific, it is preferably an ink comprising a non-cross-linking resin as a binder resin, and a thermoplastic (non-cross-linking type) urethane resin, a polyvinyl acetal base resin and the like are suitable. Further, an unsaturated polyester resin, an acryl resin or a vinyl chloride-vinyl acetate copolymer can be mixed, if necessary, in order to control an extent of formation of the low lustrous area and a contrast of a difference in a glossiness between the low lustrous area and a periphery thereof.

The low glossy picture ink for forming the low glossy picture ink layer 13 can provide a picture pattern by adding a colorant, but it does not necessarily have to be colored by adding the colorant. Among patterns expressed by the picture layer 12, a part to visually express a concave part by removing a glossiness is brought into line with the low glossy picture ink layer 13, whereby a pattern provided with a visual concave part by a difference in a glossiness is obtained. When a woodgrain pattern is to be expressed by the picture layer 12, a vessel part of the woodgrain is brought into line with an ink part of the low glossy picture ink layer 13, whereby a pattern in which the vessel part is visually turned to a concave part by a difference in a glossiness is obtained. In particular, in the decorative sheet 10 of the present invention, the low glossy picture ink layer 13 can be provided immediately on the picture layer 12 directly or via a transparent primer layer by printing and the like and therefore is readily brought into line with the picture layer 12, and the excellent design expression can be achieved.

A coating amount of the low glossy picture ink for forming the low glossy picture ink layer 13 falls preferably in a range of 0.1 to 10 g/m². If it is 0.1 g/m² or more, an interaction of the low glossy picture ink with the ionizing radiation curable resin composition is brought about, and the low lustrous area is sufficiently obtained, so that a sufficiently large difference in a glossiness on the surface of the decorative sheet is obtained. On the other hand, if the coating amount is 10 g/m² or less, mechanical limitation is removed in printing with the low glossy picture ink, and it is economically advantageous. From the viewpoints described above, a coating amount of the low glossy picture ink falls more preferably in a range of 0.5 to 5 g/m².

An extender pigment is preferably added to the low glossy picture ink for forming the low glossy picture ink layer 13. Addition of the extender filler makes it possible to provide the low glossy picture ink composition with a thixotropic property, and when printing the low glossy picture ink layer 13 using a plate, the form of the low glossy picture ink composition is maintained. This makes it possible to emphasize a sharpness of irregularities at an end part transferring from a convex part to a concave part and express a lively design.

The extender pigment used in the present invention shall not specifically be restricted and is selected suitably from, for example, silica, talc, clay, barium sulfate, barium carbonate, calcium sulfate, calcium carbonate, magnesium carbonate and the like. Among them, preferred is silica which has a high freedom of material design such as an oil absorbency, a particle size, a pore volume and the like and which is excellent in a design property, whiteness and coating stability of the ink, and silica of fine powder is particularly preferred. A particle diameter of silica falls preferably in a range of 0.1 to 5 μm. If it is 0.1 μm or more, a thixotropic property of the ink is not extremely increased when added to the ink, and a viscosity of the ink is not elevated too much to make it easy to control printing. When delustering of a vessel pattern part is expressed, a coating thickness of the ink in the vessel pattern part is usually 5 μm or less, and if a particle diameter of silica is smaller than the coating thickness, projection of the particle is relatively suppressed and is not pronounced, so that a visual strange feeling is less liable to be brought about.

A content of the above extender pigments in the low glossy picture ink composition falls preferably in a range of 5 to 15% by mass. If it is 5% by mass or more, the low glossy picture ink composition can be provided with a satisfactory thixotropic property, and if it is 15% by mass or less, a reduction in an effect of providing a low glossiness is not completely observed, so that it is preferred.

In the decorative sheet 10 of the present invention, a primer layer may be provided, if necessary, between the picture layer 12 and the low glossy picture ink layer 13. The primer layer has a function to even out the surfaces of the picture layer 12 and the like which are provided on the support 11 and enhance an adhesive property between the low glossy picture ink layer 13 and the surface protective layer 14. Further, it has an effect of making cracks and whitening less liable to be caused in a stretched part of the surface protective layer 14.

A (meth)acryl resin, a urethane resin, a (meth)acryl-urethane copolymer resin, a vinyl chloride-vinyl acetate copolymer resin, a polyester resin, a butyral resin, chlorinated polypropylene, chlorinated polyethylene and the like are used for a primer composition constituting the primer layer.

A thickness of the primer layer is preferably 0.1 to 10 μm. If it is 0.1 μm or more, an effect of preventing cracking, breaking and whitening of the surface protective layer can sufficiently be exhibited. On the other hand, if a thickness of the primer layer is 10 μm or less, drying and curing of the coating film are stabilized when coating the primer layer, and therefore the moldability is not varied, so that it is preferred. From the viewpoints described above, a thickness of the primer layer is more preferably 1 to 10 μm.

In respect to a forming method for the primer layer, it can be formed by a direct coating method, and a transfer method can be used as well. When the primer layer is formed by the direct coating method, capable of being used are gravure coating, gravure reverse coating, gravure offset coating, spin coating, roll coating, reverse roll coating, kiss coating, wheeler coating, dip coating, solid coating by a silk screen, wire bar coating, flow coating, comma coating, overflow coating, brush coating, spray coating and the like. The transfer coating method is a method in which a coating film of a primer layer is once formed on a thin sheet (film base material) and then coated on the surface of the base material, and it includes a laminate method in which a coating film of a coating composition is adhered on a steric matter together with a base material and a transfer method in which a coating film and a transfer sheet having, if necessary, an adhesive layer formed thereon are adhered once on a releasable support sheet and in which only the support sheet is then peeled off.

In the decorative sheet 10 of the present invention, a layer obtained by cross-linking and curing an ionizing radiation curable resin composition is used as the surface protective layer 14.

The ionizing radiation curable resin composition shows a resin which is cross-linked and cured by irradiating with a ray having an energy quantum which can cross-link and cure molecules among electromagnetic waves and charged particle beams, that is, a UV ray or an electron beam. To be specific, materials suitably selected from polymerizable monomers and polymerizable oligomers or prepolymers which have so far conventionally been used as an ionizing radiation curable resin composition can be used.

To be representative, the polymerizable monomers are suitably (meth)acrylate base monomers having a radically polymerizable unsaturated group in a molecule, and among them, multifunctional (meth)acrylates are preferred. In this case, "(meth)acrylate" means "acrylate" and "methacrylate", and other similar monomers have the same meaning. The multifunctional (meth)acrylates shall not specifically be restricted as long as they are (meth)acrylates having two or more ethylenically unsaturated bonds in a molecule. To be specific, they include ethylene glycol di(meth)acrylate, propylene glycol, di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentanyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl) isocyanurate, propionic acid-modified dipentaerythritol penta(meth)acrylate, dipentaerythritol hexa(meth)acrylate, ethylene oxide-modified dipentaerythritol hexa(meth)acrylate, caprolactone-modified dipentaerythritol hexa(meth)acrylate and the like. The above multifunctional (meth)acrylates may be used alone or in combination of two or more kinds thereof.

In the present invention, monofunctional (meth)acrylates can suitably be used in combination with the multifunctional (meth)acrylate described above for the purpose of reducing a viscosity of the multifunctional (meth)acrylate as long as the effects of the present invention are not damaged. The monofunctional (meth)acrylates include, for example, methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, isobornyl (meth)acrylate and the like. The above monofunctional (meth)acrylates may be used alone or in combination of two or more kinds thereof.

Next, the polymerizable oligomers include oligomers having radically polymerizable unsaturated groups in a molecule, for example, epoxy (meth)acrylate base oligomers, urethane (meth)acrylate base oligomers, polyester (meth)acrylate base oligomers, polyether (meth)acrylate base oligomers and the like. In this respect, the epoxy (meth)acrylate base oligomers can be obtained, for example, by reacting an oxirane ring of a bisphenol type epoxy resin or a novolak type epoxy resin having a relatively low molecular weight with (meth)acrylic acid to esterify it. Further, capable of being used as well are carboxyl-modified epoxy (meth)acrylate oligomers obtained by partially modifying the above epoxy (meth)acrylate base oligomers with dibasic carboxylic anhydrides. The urethane (meth)acrylate base oligomers can be obtained, for example, by reacting polyetherpolyols or polyesterpolyols with polyisocyanates to obtain polyurethane oligomers and esterifying the polyurethane oligomers thus obtained with (meth)acrylic acid. The polyester (meth)acrylate base oligomers can be obtained, for example, by condensing polyvalent carboxylic acids with polyhydric alcohols to obtain polyester oligomers having hydroxyl groups at both ends and esterifying the hydroxyl groups of the polyester oligomers thus obtained with (meth)acrylic acid, or by adding alkylene oxides to polyvalent carboxylic acids to obtain oligomers and esterifying hydroxyl group of the oligomers thus obtained at ends with (meth)acrylic acid. The polyether (meth)acrylate base oligomers can be obtained, for example, by esterifying hydroxyl groups of polyetherpolyols with (meth)acrylic acid.

Further, the polymerizable oligomers include, in addition to the above compounds, polybutadine (meth)acrylate base oligomers having a high hydrophobic property in which a polybutadiene oligomer has a (meth)acrylate group on a side chain, silicone (meth)acrylate base oligomers having a polysiloxane bond on a main chain, aminoplast resin (meth)acrylate base oligomers obtained by modifying an aminoplast resin having a large number of reactive groups in a small molecule thereof and oligomers having a cationically polymerizable functional group in a molecule such as novolak type epoxy resins, bisphenol type epoxy resins, aliphatic vinyl ethers, aromatic vinyl ethers and the like.

Among the polymerizable monomers and the polymerizable oligomers or prepolymers each described above, polyester (meth)acrylate base oligomers having a weight average molecular weight Mw of 10,000 or more are preferably used at least partially from the viewpoint of providing the decorative sheet with a moldability, and difunctional polyester (meth)acrylate base oligomers are particularly preferred.

Further, in addition to the polyester (meth)acrylate base oligomers having a weight average molecular weight Mw of 10,000 or more, other polymerizable monomers, polymerizable oligomers and prepolymers can suitably be used in combination according to the physical properties desired to be provided. To be specific, 10 parts by mass or more of difunctional or higher, preferably trifunctional or higher urethane acrylate based on 100 parts by mass of polyester acrylate is preferably blended in order to provide the decorative sheet with a surface hardness and a scratch resistance. A monofunctional material is excellent in a moldability after curing but rough in a cross-linking density and inferior in a surface hardness in a certain case. Also, if it is less 10 parts by mass, the effects of the surface hardness and the scratch resistance are not sufficiently obtained depending on uses in a certain case.

When a UV curable resin is used as the ionizing radiation curable resin, a photopolymerization initiator is preferably added thereto in an amount of about 0.1 to 5 mass parts per 100 mass parts of the resin. The photopolymerization initiator shall not specifically be restricted and can suitably be selected from conventionally used compounds. The photopolymerization initiators used for polymerizable monomers or polymerizable oligomers having radically polymerizable unsaturated groups in molecules thereof include, for example, benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propane-1-one, 4-(2-hydroxyethoxy)phenyl-2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and the like.

The photopolymerization initiator used for polymerizable oligomers having cationically polymerizable functional groups in molecules thereof include aromatic sulfonium salts, aromatic diazonium salts, aromatic iodonium salts, metallocene compounds, benzoin sulfonic esters and the like.

Also, p-dimethylbenzoic esters, tertiary amines, thiol base sensitizers and the like can be used as a photosensitizer.

In the present invention, an electron beam curable resin is preferably used as the ionizing radiation curable resin. The electron beam curable resin composition can be used in the absence of a solvent and is more preferred from the viewpoint of environmental protection and human health. Further, it does not require a photopolymerization initiator and provides a stable curing characteristic.

Other resins can be added to the ionizing radiation curable resin composition described above as long as the effects of the present invention are displayed. For example, when the decorative sheet 10 of the present invention is intended to be provided with a flexibility, a thermoplastic resin can be added. On the other hand, when the durability against solvents is required, a thermoplastic resin is not preferably added.

The thermoplastic resin includes (meth)acryl base resins such as poly(meth)acrylic acid esters and the like, polyvinyl acetal (butyral resins) such as polyvinyl butyral and the like, polyester resins such as polyethylene terephthalate, polybutylene terephthalate and the like, vinyl chloride resins, urethane resins, polyolefins such as polyethylene, polypropylene and the like, styrene base resins such as polystyrene, poly-α-methylstyrene and the like, polyamide, polycarbonate, acetal resins such as polyoxymethylene and the like, fluororesins such as ethylene-ethylene tetrafluoride copolymers and the like, polyimide, polylactic acid, polyvinyl acetal resins, liquid crystalline polyester resins and the like. They may be used alone or in combination of two or more kinds thereof. When used in combination of two or more kinds thereof, they may be copolymers of monomers constituting the above resins, or the respective resins may be used in a mixture.

Among the thermoplastic resins described above, resins comprising (meth)acryl base resins as principal components are preferred in the present invention, and among them, resins obtained by polymerizing monomers comprising at least (meth)acrylic esters as a monomer component are preferred.

To be more specific, preferred are homopolymers of (meth) acrylic esters, copolymers of two or more kinds of different (meth)acrylic ester monomers and copolymers of (meth) acrylic esters with other monomers.

The thermoplastic resins described above have a weight average molecular weight falling preferably in a range of 90,000 to 120,000. If the weight average molecular weight falls in the above range, all of a moldability after cross-linking and curing to form the surface protective layer and an abrasion resistance and a scratch resistance of the surface can be obtained at high levels.

In this regard, the weight average molecular weight is a polystyrene-reduced value measured by gel permeation chromatography (GPC). A solvent used above can suitably be selected from solvents usually used and includes, for example, tetrahydrofuran (THF), N-methyl-2-pyrrolidinone (MP) and the like.

The thermoplastic resins described above have a polydispersion degree (weight average molecular weight Mw/number average molecular weight Mn) falling preferably in a range of 1.1 to 3.0. If the polydispersion degree falls in the above range, all of a moldability after cross-linking and curing to form the surface protective layer and an abrasion resistance and a scratch resistance of the surface can be obtained at high levels. From the viewpoint described above, a polydispersion degree of the above (meth)acryl base resins falls more preferably in a range of 1.5 to 2.5.

In the decorative sheet 10 according to the first embodiment of the present invention, a cured matter obtained from the resin composition for forming the surface protective layer by a method shown below has a tensile modulus of more than 100 MPa to less than 1000 MPa. If the cured matter has a tensile modulus of 100 MPa or less, an abrasion resistance, a scratch resistance, a solvent resistance and a contaminant resistance on the surface which are sufficiently high are not obtained. On the other hand, if the above cured matter has a tensile modulus of 1000 MPa or more, the coating film is short of a flexibility, and cracks are produced on the coating film by bending and impact. From the viewpoints described above, the above tensile modulus is preferably 500 to 900 MPa, more preferably 700 to 800 MPa.

Measuring Method of Tensile Modulus:

The resin composition for forming the surface protective layer is coated on a biaxially stretched polyester film so that a thickness after cured is 20 µm and cured by irradiating with an ionizing radiation, and the coating film thus obtained is peeled off from the polyester film to prepare a sample. The above sample is used to measure a tensile modulus at a tensile rate of 50 mm/minute by means of a tensile testing machine (for example, a Tensilon universal testing machine manufactured by A & D Company Limited).

On the other hand, in the decorative sheet 10 according to the second embodiment of the present invention, a cured matter obtained from the resin composition for forming the surface protective layer by the method described above has a tensile modulus of more than 100 MPa. If the cured matter has a tensile modulus of more than 100 MPa, an abrasion resistance, a scratch resistance, a solvent resistance and a contaminant resistance on the surface are improved. From the viewpoint described above, the above tensile modulus is more preferably 500 MPa or more, particularly preferably 700 MPa or more.

The resin composition for constituting the surface protective layer in the present invention can be blended with various additives according to the desired physical properties of the cured resin layer obtained. In particular, a lubricant is preferably added in order to further improve a scratch resistance of the Surface. The lubricant includes waxes such as synthetic waxes, petroleum waxes, waxes originating in animals, waxes originating in plants and the like, reactive silicones, fluorine base lubricants and the like.

The synthetic waxes are produced by subjecting hydrocarbon base compounds to chemical synthesis and divided roughly into hydrocarbon base synthetic waxes and non-hydrocarbon base synthetic waxes such as higher fatty acid esters, fatty acid amides and the like.

The hydrocarbon base synthetic waxes include polyethylene waxes produced by polymerizing ethylene and thermal cracking polyethylene and Fischer-Tropsch waxes produced by reacting carbon monoxide with hydrogen.

The petroleum waxes include paraffin waxes (prepared by separating and extracting hydrocarbons having a good crystallinity from a vacuum distillate oil part of a crude oil, comprising linear hydrocarbons (normal paraffins) as a principal component and having a melting point of 40 to 70° C. in many cases), microcrystalline waxes (waxes taken out principally from a vacuum distillate oil part of a crude oil; a large part of constitutional hydrocarbons comprises branched hydrocarbons (isoparaffins) and saturated cyclic hydrocarbons (cycloparaffins), and therefore they have small crystals as compared with those of paraffin waxes; a molecular weight is large, and therefore a melting point is as high as 60 to 90° C.) and the like.

The waxes originating in animals include bees waxes, wool waxes, spermacetic waxes, shellac waxes, Chinese waxes and the like.

The waxes originating in plants include carnauba waxes, candelilla waxes, haze waxes, rice waxes (rice bran waxes) and the like.

Among the various waxes described above, the synthetic waxes are preferred, and the polyethylene waxes are particularly preferred. The polyethylene waxes have a very low frictional coefficient and have a toughness in combination therewith, and therefore they have the effects of protecting the surface of the surface protective layer and making it easy to wipe off fingerprints put thereon.

A melting point of the waxes is preferably 90 to 140° C. An average particle diameter shall not specifically be restricted and is suitably set preferably according to a thickness of the surface protective layer. In the present use, it is preferably 1 to 30 µm, particularly preferably 1 to 20 µm.

In the present invention, it is the preferred embodiment to use a reactive silicone as the lubricant. In this regard, the reactive silicone is a modified silicone oil in which an organic group is introduced into a side chain and/or an end and in which the organic group has a reactivity. The reactive silicone is reacted with the ionizing radiation curable resin when the ionizing radiation curable resin composition is cured, and it is bonded thereto and integrated therewith, so that it does not bleed out on the surface; it provides the surface of the decorative sheet of the present invention with a lubricity to improve a scratch resistance and the like, and therefore it is particularly preferred.

Further, the reactive silicone does not exert an influence on a smoothness and a glossiness of the surface by blending unlike the preceding waxes, and therefore it is suitable particularly when expressing a specular property and a high glossy design.

The kind of the reactive silicone includes a side chain type of modified silicone oils, a both end type of modified silicone oils and a side chain both end type of modified silicone oils, and it includes, depending on the organic group introduced, amino-modified silicone oils, epoxy-modified silicone oils, mercapto-modified silicone oils, carboxyl-modified silicone oils, carbinol-modified silicone oils, phenol-modified silicone oils, methacryl-modified silicone oils, heterogeneous functional group-modified silicone oils and the like.

A content of the reactive silicone falls preferably in a range of 0.1 to 50 parts by mass based on 100 parts by mass of the ionizing radiation curable resin composition. If it is 0.1 part by mass or more, the surface can be provided with a sufficiently high lubricity. If it is 50 parts by mass or less, cissing is not caused when coating, and the coating film surface is not roughened. In addition thereto, the coating material stability can be enhanced. From the viewpoints described above, the above content falls more preferably in a range of 0.5 to 10 parts by mass.

The fluorine base lubricants include, for example, polytetrafluoroethylene, polychlorotrifluoroethylene, polyhexafluoropropylene, polyvinylidene fluoride, polyvinyl fluoride, tetrafluoroethylene-hexafluoropropylene binary copolymers, tetrafluoroethylene-hexafluoropropylene-vinylidene fluoride ternary copolymers and the like.

Expression of the design property can freely be controlled from high glossiness to low glossiness by controlling an amount of a delustering agent blended with the resin composition for constituting the surface protective layer in the present invention, and the design property can be enhanced more. To be specific, when the low glossy picture ink layer is provided, lower glossiness can be expressed by blending the surface protective layer with the delustering agent in combination with a delustering effect of the low glossy picture ink layer (refer to FIG. 1). On the other hand, when the low glossy picture ink layer is not provided, a design which is highly glossy and excellent in a flatness and a specular property can be expressed by blending the surface protective layer with no delustering agent or reducing a blending amount thereof (refer to FIG. 2).

The delustering agent is suitably selected from, for example, silica, talc, clay, barium sulfate, barium carbonate, calcium sulfate, calcium carbonate, magnesium carbonate and the like. Among them, preferred is silica which has a high freedom of material design such as an oil absorbency, a particle size, a pore volume and the like and which is excellent in a design property, whiteness and coating stability of the ink, and silica of fine powder is particularly preferred.

A particle diameter of the delustering agent is 0.1 to 20 µm, preferably 1 to 10 µm.

A content of the delustering agent in the resin composition constituting the surface protective layer falls preferably in a range of 1 to 80% by mass.

The other additives include, for example, weatherability improving agents, abrasion resistance improving agents, polymerization inhibitors, cross-linking agents, IR absorbing agents, antistatic agents, adhesion improving agents, leveling agents, thixotropic agents, coupling agents, plasticizers, defoaming agents, fillers, solvents, colorants and the like.

In this respect, UV absorbing agents and light stabilizers can be used as the weatherability improving agent. The UV absorbing agents may be either inorganic or organic compounds. Titanium oxide, cerium oxide and zinc oxide each having an average particle diameter of 5 to 120 nm can be used as the inorganic UV absorbing agent. The organic UV absorbing agent includes benzotriazole base compounds, benzophenone base compounds, benzoate base compounds, triazine base compounds, cyanoacrylate base compounds and the like, and the benzotriazole base compounds include, for example, to be specific, 2-(2-hydroxy-5-methylphenyl)benzotriazole, 2-(2-hydroxy-3,5-di-tert-amylphenyl)benzotriazole, 3-[3-(benzotriazole-2-yl)-5-tert-butyl-4-hydroxyphenyl]propionic ester of polyethylene glycol and the like. On the other hand, the light stabilizers include, for example, hindered amine base compounds, to be specific, bis(1,2,2,6, 6-pentamethyl-4-piperizyl) 2-(3,5-di-tert-butyl-4-hydroxybenzyl)-2'-n-butylmalonate, bis(1,2,2,6,6-pentamethyl-4-piperidyl) sebacate, tetrakis(2,2,6,6-tetramethyl-4-piperidyl)-1,2,3,4-butanetetracarboxylate and the like. Further, reactive UV absorbing agents and light stabilizers having polymerizable groups such as a (meth)acryloyl group in molecules thereof can also be used as the UV absorbing agent and the light stabilizer.

The abrasion resistance improving agent includes, in the case of, for example, the inorganic compounds, spherical particles of α-alumina, silica, kaolinite, iron oxide, diamond, silicon carbide and the like. The particle form shall not specifically be restricted and includes a spherical shape, an ellipsoidal shape, a polyhedral shape, a scale-like shape and the like, and the spherical shape is preferred. The organic abrasion resistance improving agent includes synthetic resin beads of cross-linked acrylic resins, polycarbonate resins and the like. The particle diameter thereof is usually 30 to 200 of the film thickness. Among the above compounds, spherical α-alumina is particularly preferred in terms of a high hardness, a large effect of enhancing the abrasion resistance and relatively easily obtaining the spherical particles.

Used as the polymerization inhibitor are, for example, hydroquinone, p-benzoquinone, hydroquinone monomethyl ether, pyrogallol, t-butyl catechol and the like. Used as the cross-linking agent are, for example, polyisocyanate compounds, epoxy compounds, metal chelate compounds, aziridine compounds, oxazoline compounds and the like.

Used as the filler are, for example, barium sulfate, talc, clay, calcium carbonate, aluminum hydroxide and the like.

Used as the colorant are, for example, publicly known coloring pigments such as quinacridone red, isoindolinone yellow, phthalocyanine blue, phthalocyanine green, titanium oxide, carbon black and the like.

Used as the IR absorbing agent are, for example, dithiol base metal complexes, phthalocyanine base compounds, diimmonium compounds and the like.

The surface protective layer 14 can be formed by preparing a coating liquid containing the resin composition for forming the surface protective layer and coating, cross-linking and curing it. A viscosity of the above coating liquid shall not specifically be restricted as long as it is a viscosity at which an uncured resin layer can be formed on a surface of the substrate by a coating method described later.

In the present invention, the coating liquid prepared is applied on a surface of the support 11 by a publicly known method such as gravure coating, bar coating, roll coating, reverse roll coating, comma coating and the like, preferably gravure coating so that a thickness after cured is 1 to 30 µm, whereby an uncured resin layer is formed.

In the present invention, the uncured resin layer thus formed is irradiated with an ionizing radiation such as an electron beam, a UV ray and the like to cure the above uncured resin layer. In this regard, when an electron beam is used as the ionizing radiation, an acceleration voltage thereof can suitably be selected according to the resin used and a thickness of the layer, and the uncured resin layer is preferably cured at an acceleration voltage of usually 70 to 300 kV.

In irradiation of the electron beam, the higher the acceleration voltage is, the more the penetrability of the electron beam is increased, and therefore when a base material which is deteriorated by an electron beam is used for the support 11, the acceleration voltage is selected so that a depth of penetration of the electron beam is substantially the same as a thickness of the resin layer, whereby the electron beam can be inhibited from being irradiated excessively onto the support 11, and deterioration of the base material caused by irradiation with an excessive amount of the electron beam can be allowed to stay in a minimum level.

An irradiation dosage of the electron beam is preferably an amount in which a cross-linking density of the resin layer is saturated, and it is selected in a range of usually 5 to 300 kGy (0.5 to 30 Mrad), preferably 10 to 100 kGy (1 to 10 Mrad).

Further, the electron beam source shall not specifically be restricted, and capable of being used are various electron beam accelerators such as a Cockroft-Walton type accelerator, a Van de Graft type accelerator, a resonance transformer type accelerator, an insulating core transformer type accelerator, a linear type accelerator, a Dynamitron type accelerator, a high frequency type accelerator and the like.

When a UV ray is used as the ionizing radiation, the radiation containing a UV ray having a wavelength of 190 to 380 nm is radiated. The UV ray source shall not specifically be restricted, and used are, for example, a high pressure mercury lamp, a low pressure mercury lamp, a metal halide lamp, a carbon arc lamp and the like.

Various additives can be added to the cured resin layer thus formed to thereby impart various functions, for example, a so-called hard coat function providing a high hardness and an abrasion resistance, a defogging coat function, a stain resistant coat function, a glare-proof coat function, an antireflective coat function, a UV shielding coat function, an IR shielding coat function and the like.

In the present invention, a thickness of the surface protective layer 14 after cured is preferably 1 to 30 μm. If a thickness of the surface protective layer 14 after cured is 1 μm or more, the sufficiently high physical properties of the protective layer such as a contamination resistance, an abrasion resistance, a weatherability and the like are obtained, and the irregularities of the support, the picture layer and the primer layer are prevented from appearing on the surface. Accordingly, a flatness of the surface is secured, and the high glossy feeling and the satisfactory specular property are obtained. On the other hand, if it is 30 μm or less, the effects of the low glossy ink layer are sufficiently displayed, and the moldability is improved. From the viewpoints of securing the better moldability and obtaining the satisfactory abrasion resistance and the satisfactory weatherability, a thickness of the surface protective layer 14 after cured falls in a range of more preferably 2 to 20 μm, particularly preferably 3 to 10 μm.

In the decorative sheet 10 according to the first embodiment of the present invention, it is essential that a static frictional coefficient (μs) on the surface is 1.0 or less. If the static frictional coefficient (μs) on the surface is 1.0 or less, the decorative sheet which is excellent in an abrasion resistance and a scratch resistance on a surface is obtained. From the viewpoint described above, the static frictional coefficient (μs) is more preferably 0.5 or less. A method for controlling the static frictional coefficient (μs) to 1.0 or less and to 0.5 or less includes a method in which the lubricant such as the reactive silicone acrylates, the waxes, the fluorine base lubricants and the like each described above is added to the resin composition for forming the surface protective layer.

The static frictional coefficient (μs) is measured at an incline rate of 1 degree/second by means of an "abrasion measuring device AN" manufactured by Toyo Seiki Seisakusho, Ltd.

On the other hand, in the decorative sheet 10 according to the second embodiment of the present invention, it is not essential that a static frictional coefficient (μs) on the surface is 1.0 or less. Because of the same reason as described above, the static frictional coefficient (μs) on the surface is preferably 1.0 or less, more preferably 0.5 or less.

Further, in the decorative sheet of the present invention, a tensile elongation in a tensile test according to JIS K 7127 is preferably 50% or more. The higher the tensile elongation is, the more the moldability is improved, and if the tensile elongation is 50% or more, cracks are not produced on the surface protective layer in vacuum molding in a vacuum molding die usually used. The tensile elongation is more preferably 150% or more. If the tensile elongation is 150% or more, the decorative sheet follows a complicated form and a largely deformed form, and cracks are not produced on the surface protective layer.

In respect to the measuring conditions of the tensile test, a test piece having a width of 25 mm and a length of 120 mm is used to measure a tensile elongation on the conditions of a tensile rate of 1000 mm/minute, a chuck-to-chuck distance of 50 mm, a marker-to-marker distance of 50 mm and a temperature of 160° C., and it is evaluated by the tensile elongation observed when cracks are produced on the surface protective layer.

The decorative sheet of the present invention is used for an insert molding method. In the insert molding method, the decorative sheet of the present invention is subjected in advance to vacuum molding (off-line preliminary molding) in a surface form of a molded article by a vacuum molding die in a vacuum molding step, and then excess parts are trimmed, if necessary, to obtain a molded sheet. This molded sheet is inserted into an injection molding die to clamp the injection molding die, and a resin staying in a flowing state is injected into the die and solidified to integrate the decorative sheet on an outer surface of the resin molding at the same time as injection molding, whereby a decorated resin molding is produced.

Resins according to the uses are used for the injection resin, and polyolefin base resins such as polyethylene, polypropylene and the like and thermoplastic resins such as ABS resins, styrene resins, polycarbonate resins, acryl resins, vinyl chloride resins and the like are representative. Further, thermosetting resins such as urethane resins, epoxy resins and the like can be used as well according to the uses.

In the decorated resin molding produced in, the manner described above, cracks are not produced on the surface protective layer in the molding step, and the surface has a high abrasion resistance and a high scratch resistance. Also, it has a high solvent resistance and a high chemical resistance against an acryl film which has so far been used as a surface protective layer. Further, in the production process of the present invention, the surface protective layer is completely cured in a production stage of the decorative sheet, and therefore a step in which the surface protective layer is cross-linked and cure after producing the decorated resin molding is not required.

The decorated resin molding of the present invention is suited to uses such as, for example, interior materials or exterior materials of vehicles such as cars and the like, fixture members such as base boards, edging or finishing boards and the like, fittings such as window frames, door frames and the like, interior materials of buildings such as walls, floors, ceilings and the like, housings of home electric appliances such as TV receivers, air conditioners and the like, vessels and the like.

EXAMPLES

Next, the present invention shall be explained in further details with reference to examples, but the present invention shall by no means be restricted by these examples.
Evaluation Methods:
(1) Static Frictional Coefficient (tan θ)
The decorative sheets and the decorated resin moldings each obtained in the respective examples and comparative examples were used to measure a static frictional coefficient on a surface at an incline rate of 1 degree/second by means of the "abrasion measuring device AN" manufactured by Toyo Seiki Seisaku-sho, Ltd.
(2) Tensile Modulus:
Measured by the method described in the specification.
(3) Tensile Elongation:
Measured by the method described in the specification,
(4) Moldability A (Form Following Property of Coating Film):
The decorative sheets obtained in the respective examples and comparative examples were subjected to vacuum molding by a method shown below, and the moldability was evaluated by the appearance after the molding. The evaluation criteria are shown below,
a: Cracking and whitening of the coating film were not observed on the surface protective layer, and the form of the die was followed well.
b: The form of the die could not be followed, and cracking and whitening of the coating film were observed on the surface protective layer.
<Vacuum Molding>
The decorative sheet was heated to 160° C. by means of an infrared heater and softened. Then, it was subjected to vacuum molding by means of a vacuum molding die (maximum stretching magnification: 150 magnifications) and molded in an inner form of the die. The decorative sheet was separated from the die, and unnecessary parts were trimmed to obtain a molded sheet.
(5) Moldability B (Form Holding Property after Vacuum Molding):
The sheet obtained by vacuum molding by the method described above was left standing for 24 hours, and the form thereof was compared with that of the sheet immediately after the molding. The evaluation criteria are shown below.
a: Form of the sheet immediately after molding agreed with that of the sheet after left standing for 24 hours.
b: Form of the sheet immediately after molding disagreed with that of the sheet after left standing for 24 hours.
(6) Abrasion Resistance:
The decorative sheets produced in the respective examples and comparative examples were subjected to a test by reciprocating 2000 times at a load of 500 gf by means of a Gakushin type friction fastness testing equipment manufactured by Tester Sangyo Co., Ltd. using Kanakin No. 3 as a white cotton cloth for friction. The evaluation criteria are shown below.
a: Seemingly no marked scratches observed.
b: Small scratches observed on the surface
c: Marked scratches observed on the surface.
(7) Pencil Hardness Test:
The decorative sheets obtained in the respective examples and comparative examples were used to carry out insert molding, and the moldings obtained were used to measure a pencil hardness on the conditions of a load of 750 gf and a test speed of 1 mm/second by means of "an electric pencil scratching hardness test device" manufactured by Yasuda Seiki Seisakusho, Ltd. using "Uni Pencil" manufactured by Mitsubishi Pencil Co., Ltd.
(8) Design Property:
The decorative sheets obtained in the respective examples and comparative examples were used to carry out insert molding, and the moldings obtained were used to evaluate visually a design property of the surface. The evaluation criterion was divided into the sheets having a low glossy design property (Examples 1 to 6, Example 9 and all comparative examples) and the sheets having a high glossy design property (Examples 7 and 8), and the respective sheets were evaluated according to the following evaluation criteria.
Sheets Having a Low Glossy Design Property:
a: Vessel part was recognized as a concave part; further, the picture of a woodgrain was brought into line with the vessel part, and therefore the texture of the woodgrain was obtained more; and the design property was very high.
b: Vessel part was recognized as a concave part, but the texture of a woodgrain in which the picture of the woodgrain was brought into line with the vessel part was not obtained.
c: Design was planar, and design property was inferior.
Sheets Having a High Glossy Design Property:
a: Flatness and specular property were excellent, and design property was very high.
b: Flatness and specular property were poor, and design property was inferior.

Example 1

Reactive silicone 2 parts by mass and silica having an average particle diameter of 3.0 μm 10 parts by mass as a delustering agent were added to 100 parts by mass of an electron beam curable resin (hereinafter referred to as "an EB resin") comprising 60% by mass of difunctional urethane acrylate (EB-1, weight average molecular weight: 2000) and 40% by mass of difunctional polyester acrylate (EB-2, weight average molecular weight: 10000) to obtain an electron beam curable resin composition for forming a surface protective layer. A tensile modulus of the EB resin was 750 MPa.

Next, a sheet (ABS-1, flexural modulus: 2000 MPa, thickness: 400 μm) comprising an ABS resin was used as a support to form a picture layer of a grain pattern on a surface of the above sheet by gravure printing using a two-component curing type urethane ink. Then, a two-component curing type urethane base resin comprising an acryl/urethane block copolymer as a principal component and isocyanate as a curing agent was coated on the picture layer to form a transparent primer layer having a thickness of 2 μm. An ink obtained by blending 100 parts by mass of a polyester urethane base printing ink having a number average molecular weight of 3000 and a glass transition temperature (Tg) of −62.8° C. with 10 parts by mass of silica having an average particle diameter of 3.0 μm was coated on the above primer layer by gravure printing so that it was brought into line with a vessel part of the grain pattern in the picture layer described above, whereby a low glossy picture ink layer having a thickness of 1.0 μm was obtained.

The electron beam curable resin composition for forming a surface protective layer described above was coated on the above low glossy picture ink layer so that a thickness after cured was 6 μm. The above uncured resin layer was irradiated with an electron beam at an accelerating voltage of 165 kV and an exposure dose of 50 kGy (5 Mrad) to cure the electron beam curable resin composition, whereby a decorative sheet was obtained.

The above decorative sheet was evaluated by the methods described above. The evaluation results thereof are shown in Table 1.

Example 2

A decorative sheet was obtained in the same manner as in Example 1, except that in Example 1, a content of the reactive silicone was changed to 1 part by mass based on 100 parts by mass of the EB resin. A tensile modulus of the ES resin was 750 MPa. Results obtained by evaluating the decorative sheet in the same manner as in Example 1 are shown in Table 1.

Example 3

A decorative sheet was obtained in the same manner as in Example 1, except that in Example 1, the contents of EB-1 and EB-2 in the EB resin were changed to 35% by mass and 65% by mass respectively. Results obtained by evaluating the decorative sheet in the same manner as in Example 1 are shown in Table 1. A tensile modulus of the EB resin was 630 MPa.

Example 4

A decorative sheet was obtained in the same manner as in Example 1, except that in Example 1, difunctional urethane acrylate (EB-3, weight average molecular weight: 10000) was used as the EB resin. Results obtained by evaluating the decorative sheet in the same manner as in Example 1 are shown in Table 1. A tensile modulus of the EB resin was 450 MPa.

Example 5

A decorative sheet was obtained in the same manner as in Example 1, except that in Example 1, a mixture comprising 40% by mass of the difunctional urethane acrylate (EB-1, weight average molecular weight: 2000) and 60% by mass of the difunctional urethane acrylate (EB-3, weight average molecular weight: 10000) was used as the EB resin. Results obtained by evaluating the decorative sheet in the same manner as in Example 1 are shown in Table 1. A tensile modulus of the EB resin was 520 MPa.

Example 6

A decorative sheet was obtained in the same manner as in Example 1, except that in Example 1, used as the electron beam curable resin composition for forming a surface protective layer was a mixture obtained by adding 2 parts by mass of reactive silicone and 10 parts by mass of silica having an average particle diameter of 3.0 μm as a delustering agent to 100 parts by mass of a resin composition comprising 40% by mass of tetrafunctional urethane acrylate (EB-4, weight average molecular weight: 4000) and 60 g by mass of polymethyl methacrylate (PMMA, weight average molecular weight: 6800). Results obtained by evaluating the decorative sheet in the same manner as in Example 1 are shown in Table 1. A tensile modulus of the above resin composition was 700 MPa.

Example 7

A decorative sheet was obtained in the same manner as in Example 1, except that in Example 1, the low glossy picture ink layer was not provided; the electron beam curable resin composition for forming a surface protective layer was coated on the transparent primer layer; and the delustering agent was not contained in the electron beam curable resin composition for forming a surface protective layer. A tensile modulus of the EB resin was 750 MPa. The evaluation results thereof are shown in Table 1.

Example 8

A decorative sheet was obtained in the same manner as in Example 3, except that in Example 3, the low glossy picture ink layer was not provided; the electron beam curable resin composition for forming a surface protective layer was coated on the transparent primer layer; and the delustering agent was not contained in the electron beam curable resin composition for forming a surface protective layer. A tensile modulus of the EB resin was 630 MPa.

The above decorative sheet was evaluated by the methods described above. The evaluation results thereof are shown in Table 1.

Example 9

A decorative sheet was obtained in the same manner as in Example 1, except that in Example 1, a polypropylene resin (PP, flexural modulus: 1500 MPa, thickness: 250 μm) was used for the support in place of the ABS resin. Results obtained by evaluating the decorative sheet in the same manner as in Example 1 are shown in Table 1.

Comparative Example 1

A decorative sheet was obtained in the same manner as in Example 1, except that in Example 1, the reactive silicone was not added. Results obtained by evaluating the decorative sheet in the same manner as in Example 1 are shown in Table 1.

Comparative Example 2

A decorative sheet was obtained in the same manner as in Example 1, except that in Example 1, a sheet (ABS-2, flexural modulus: 1200 MPa, thickness: 400 μm) comprising an ABS resin was used as the support. Results obtained by evaluating the decorative sheet in the same manner as in Example 1 are shown in Table 1.

Comparative Example 3

A decorative sheet was obtained in the same manner as in Example 2, except that in Example 2, the sheet (ABS-2, flexural modulus; 1200 MPa, thickness: 400 μm) comprising an ABS resin was used as the support. Results obtained by evaluating the decorative sheet in the same manner as in Example 1 are shown in Table 1.

Comparative Example 4

A decorative sheet was obtained in the same manner as in Example 1, except that in Example 1, the reactive silicone was not added and that the sheet (ABS-2, flexural modulus; 1200 MPa, thickness: 400 μm) comprising an ABS resin was used as the support. Results obtained by evaluating the decorative sheet in the same manner as in Example 1 are shown in Table 1.

Comparative Example 5

A decorative sheet was obtained in the same manner as in Example 3, except that in Example 3, the reactive silicone was not added. Results obtained by evaluating the decorative sheet in the same manner as in Example 1 are shown in Table 1.

Comparative Example 6

A decorative sheet was obtained in the same manner as in Example 3, except that in Example 3, the sheet (ABS-2, flexural modulus: 1200 MPa, thickness: 400 µm) comprising an ABS resin was used as the support. Results obtained by evaluating the decorative sheet in the same manner as in Example 1 are shown in Table 1.

Comparative Example 7

A decorative sheet was obtained in the same manner as in Example 3, except that in Example 3, the reactive silicone was not added and that the sheet (ABS-2, flexural modulus: 1200 MPa, thickness: 400 µm) comprising an ABS resin was used as the support. Results obtained by evaluating the decorative sheet in the same manner as in Example 1 are shown in Table 1.

Comparative Example 8

A decorative sheet was obtained in the same manner as in Example 1, except that in Example 1, only EB-2 was used as the EB resin. Results obtained by evaluating the decorative sheet in the same manner as in Example 1 are shown in Table 1. A tensile modulus of the EB resin was 100 MPa.

Comparative Example 9

A decorative sheet was obtained in the same manner as in Example 1, except that in Example 1, only EB-1 was used as the EB resin. Results obtained by evaluating the decorative sheet in the same manner as in Example 1 are shown in Table 1. A tensile modulus of the EB resin was 1000 MPa.

Comparative Example 10

An ink comprising an acryl base resin was used to form a picture layer of a grain pattern on a surface of an acryl film. Next, an ink prepared by adding 20 parts by mass of silica having an average particle diameter of 3.0 µm as a delustering agent to 100 parts by mass of a two-component curing type resin comprising acryl polyol as a principal component and isocyanate as a curing agent was coated on a rear face (a face at a side in which the picture printed layer was not provided) of the acryl film by gravure printing to form a vessel part.

Next, a two-component curing type urethane base resin adhesive was coated in a film thickness of 10 µm on a picture layer side of the above sheet, and a masking colored ABS resin sheet having a film thickness of 400 µm which was a backer film was laminated thereon to obtain a decorative sheet. Results obtained by evaluating the decorative sheet in the same manner as in Example 1 are shown in Table 1.

Reference Example 1

An electron beam curable resin composition was obtained in the same manner as in Example 1.

Next, a transparent polypropylene base film having a thickness of 60 µm which was subjected to corona discharge treatment on both surfaces was used as a base material, and a picture layer of a grain pattern was formed on a rear face of the above film by gravure printing using a two-component curing type urethane ink. Then, a two-component curing type urethane base resin comprising an acryl/urethane block copolymer as a principal component and isocyanate as a curing agent was coated on the surface on which the picture layer was not provided to form a transparent primer layer having a thickness of 2 µm. An ink obtained by blending 100 parts by mass of a polyester urethane base printing ink having a number average molecular weight of 3000 and a glass transition temperature (Tg) of −62.8° C. with 10 parts by mass of silica having an average particle diameter of 3.0 µM was coated on the above primer layer by gravure printing so that it was brought into line with a vessel part of the grain pattern in the picture layer described above, whereby a low glossy picture ink layer having a thickness of 1.0 µm was obtained.

The electron beam curable resin composition for forming a surface protective layer described above was coated on the above low glossy picture ink layer so that a thickness after cured was 3 µm. The above uncured resin layer was irradiated with an electron beam at an accelerating voltage of 165 kV and an exposure dose of 50 kGy (5 Mrad) to cure the electron beam curable resin composition. Next, a two-component curing type urethane base resin adhesive was coated in a film thickness of 10 µm on a picture layer side of the above sheet, and a masking colored ABS resin sheet having a film thickness of 400 µm which was a backer film was laminated thereon to obtain a decorative sheet. Results obtained by evaluating the decorative sheet in the same manner as in Example 1 are shown in Table 1.

TABLE 1

| | Ionizing radiation curable resin | | | | | Thermo-setting resin | Reactive | | Static frictional coefficient | | Tensile modulus | Tensile elongation | Moldability | | Abrasion | Pencil | Design property | |
|---|---|---|---|---|---|---|---|---|---|---|---|---|---|---|---|---|---|---|
| | EB-1 | EB-2 | EB-3 | EB-4 | PMMA | | silicone | Support | Sheet | Molding | (MPa) | (%) | A | B | tance | hardness | Low gloss | High gloss |
| Example 1 | 60 | 40 | — | — | — | — | 2 | ABS-1 | 0.02 | 0.09 | 750 | 120 | a | a | a | F | a | — |
| Example 2 | 60 | 40 | — | — | — | — | 1 | ABS-1 | 0.42 | 0.70 | 750 | 120 | a | a | a | F | a | — |
| Example 3 | 35 | 65 | — | — | — | — | 2 | ABS-1 | 0.14 | 0.19 | 630 | >150 | a | a | a | HB | a | — |
| Example 4 | — | — | 100 | — | — | — | 2 | ABS-1 | 0.65 | — | 450 | >150 | a | a | a | B | a | — |
| Example 5 | 40 | — | 60 | — | — | — | 2 | ABS-1 | 0.53 | — | 520 | 110 | a | a | a | HB | a | — |
| Example 6 | — | — | — | 40 | 60 | — | 2 | ABS-1 | 0.44 | — | 700 | >150 | a | a | a | HB | a | — |
| Example 7 | 60 | 40 | — | — | — | — | 2 | ABS-1 | 0.01 | 0.08 | 750 | 140 | a | a | a | HB | — | a |
| Example 8 | 35 | 65 | — | — | — | — | 2 | ABS-1 | 0.30 | 0.60 | 630 | >150 | a | a | a | HB | — | a |
| Example 9 | 60 | 40 | — | — | — | — | 2 | PP | — | — | — | — | a | a | a | HB | a | — |

TABLE 1-continued

| | Ionizing radiation curable resin | | | | Thermo-setting resin | Reactive silicone | Support | Static frictional coefficient | | Tensile modulus (MPa) | Tensile elonga-tion (%) | Mold-ability | | Abra-sion resis-tance | Pencil hard-ness | Design property | |
|---|---|---|---|---|---|---|---|---|---|---|---|---|---|---|---|---|---|
| | EB-1 | EB-2 | EB-3 | EB-4 | PMMA | | | Sheet | Molding | | | A | B | | | Low gloss | High gloss |
| Comparative Example 1 | 60 | 40 | — | — | — | 0 | ABS-1 | 1.43 | 2.14 | 750 | 120 | a | a | c | B | a | — |
| Comparative Example 2 | 60 | 40 | — | — | — | 2 | ABS-2 | 0.02 | — | 750 | 120 | a | b | a | B | a | — |
| Comparative Example 3 | 60 | 40 | — | — | — | 1 | ABS-2 | 0.42 | — | 750 | 120 | a | b | a | 2B | a | — |
| Comparative Example 4 | 60 | 40 | — | — | — | 0 | ABS-2 | 1.43 | — | 630 | 120 | a | b | c | 3B | a | — |
| Comparative Example 5 | 35 | 65 | — | — | — | 0 | ABS-1 | 2.36 | 3.27 | 630 | >150 | a | a | c | 2B | a | — |
| Comparative Example 6 | 35 | 65 | — | — | — | 2 | ABS-2 | 0.14 | — | 630 | >150 | a | b | a | 3B | a | — |
| Comparative Example 7 | 35 | 65 | — | — | — | 0 | ABS-2 | 2.36 | — | 630 | >150 | a | b | c | 3B | a | — |
| Comparative Example 8 | 0 | 100 | — | — | — | 2 | ABS-1 | 0.19 | 0.34 | 100 | >150 | a | a | c | 5B | a | — |
| Comparative Example 9 | 100 | 0 | — | — | — | 2 | ABS-1 | 0.01 | 0.11 | 1000 | 35 | b | b | a | H | a | — |
| Comparative Example 10 | — | — | — | — | — | — | ABS-1 | — | — | — | — | a | a | c | F | b | — |
| Reference Example 1 | 60 | 40 | — | — | — | 2 | PP/ABS-1 | 0.46 | 0.60 | 750 | 120 | a | a | a | — | b | — |

A decorative sheet in which the resin composition of the present invention for forming a surface protective layer is used to form a surface protective layer does not bring about cracks and breaking even on the conditions of a sharp reduction in temperature from a heating temperature of about 160° C. to temperature in bringing into contact with a die, a rapid elongation speed and a high elongation degree in a conventional insert molding method. In addition thereto, it has a high design property and is provided particularly with a texture of a grain pattern.

Further, it has been confirmed that the moldability is good as described above and that the surface of the decorated resin molding produced has a high abrasion resistance and a high scratch resistance.

Industrial Applicability

The decorative sheet of the present invention has a high abrasion resistance and a high scratch resistance on a surface thereof, and it has a good moldability and is free from cracks and the like. Accordingly, a decorated resin molding produced by using the decorative sheet of the present invention does not bring about cracks on a surface protective layer thereof, and the surface thereof has a high abrasion resistance and a high scratch resistance. According to the production process of the present invention, the surface protective layer is completely cured in the production stage of the decorative sheet, and therefore a step in which the surface protective layer is cross-linked and cured after producing the decorated resin molding is not required. Further, provided is the decorative sheet having such a high design property that a difference in gloss and irregularities can be expressed by bringing it into line with the picture layer and that it is provided with a texture.

What is claimed is:

1. A decorative sheet for insert molding prepared by laminating at least a surface protective layer on a support comprising an ABS resin, wherein the above support has a flexural modulus of 1500 to 3000 MPa; the above support has a thickness of 100 to 500 μm; the above surface protective layer is obtained by cross-linking and curing an ionizing radiation curable resin composition;
    the decorative sheet has a static frictional coefficient of 1.0 or less on a surface; and
    the above ionizing radiation curable resin composition has a tensile modulus of more than 100 MPa to less than 1000 MPa which is measured by the following methods:
    the resin composition for forming the surface protective layer is coated on a biaxially stretched polyester film so that a thickness after being cured is 20 μm, and irradiated with an ionizing radiation, and a coating film after curing is peeled off from the polyester film to prepare a sample; and the above sample is used to measure a tensile modulus at a tensile rate of 50 mm/minute by means of a tensile testing machine.

2. The decorative sheet for insert molding as described in claim 1, wherein the surface protective layer has a thickness of 1 to 30 μm.

3. The decorative sheet for insert molding as described in claim 1, wherein a tensile elongation in a tensile test carried out on the following measuring conditions according to JIS K 7127 is 50% or more:
    measuring conditions:
    a test piece having a width of 25 mm and a length of 120 mm is used to measure a tensile elongation observed when cracks are produced on the surface protective layer on the conditions of a tensile rate of 1000 mm/minute, a chuck-to-chuck distance of 80 mm, a marker-to-marker distance of 50 mm and a temperature of 160° C.

4. The decorative sheet for insert molding as described in claim 1, wherein the decorative sheet includes a picture ink layer provided partially between the support and the surface protective layer;
    the surface protective layer is present on the picture ink layer and brought into contact therewith, and is coated over a whole surface including an area where the picture ink layer is formed and an area where the picture ink layer is not formed; and wherein the picture ink layer has interacted with the ionizing radiation curable resin composition so as to provide a lustrous area in the surface protective layer, over the picture ink layer and a vicinity thereof, that has a lower luster than a luster of the area where the picture ink layer is not formed.

5. The decorative sheet for insert molding as described in claim 4, wherein a picture layer is provided between the support and the picture ink layer.

6. The decorative sheet for insert molding as described in claim 1, wherein the ionizing radiation curable resin is an electron beam curable resin.

7. A production process for a decorated resin molding, comprising a vacuum molding step in which the decorative sheet as described in claim 1 is molded in advance in a stereoscopic form by a vacuum molding die, a step in which excess parts are trimmed to obtain a molded sheet and a step in which the above molded sheet is inserted into an injection molding die to close the injection molding die and in which a resin staying in a flowing state is injected into the die to integrate the resin with the molded sheet.

8. A decorated resin molding produced by the production process as described in claim 7.

9. The decorative sheet for insert molding as described in claim 1, wherein the support has a flexural modulus in a range of 1700 to 2600 MPa.

10. The decorative sheet for insert molding as described in claim 4, wherein said lustrous area in the surface protective layer is visually recognized as a concave part.

11. The decorative sheet for insert molding as described in claim 4, wherein an outermost surface of the surface protective layer above the picture ink layer is provided with a convex form.

12. The decorative sheet for insert molding as described in claim 4, wherein the picture ink layer includes a non-crosslinking resin.

13. The decorative sheet for insert molding as described in claim 1, wherein the ionizing radiation curable resin composition includes polymerizable oligomers.

14. The decorative sheet for insert molding as described in claim 1, wherein the ionizing radiation curable resin composition includes polymerizable oligomers and thermoplastic resin.

* * * * *

UNITED STATES PATENT AND TRADEMARK OFFICE
CERTIFICATE OF CORRECTION

PATENT NO. : 8,597,793 B2  Page 1 of 1
APPLICATION NO. : 12/991738
DATED : December 3, 2013
INVENTOR(S) : Saitou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 294 days.

Signed and Sealed this
Twenty-second Day of September, 2015

Michelle K. Lee
*Director of the United States Patent and Trademark Office*